(12) United States Patent
Moreau-Arnott et al.

(10) Patent No.: US 12,547,477 B2
(45) Date of Patent: *Feb. 10, 2026

(54) SYSTEMS AND METHODS FOR ROUTING DATA PAYLOADS THROUGH A PLURALITY OF MICROSERVICES USING MACHINE LEARNING

(71) Applicant: Capital One Services, LLC, McLean, VA (US)

(72) Inventors: Elijah Moreau-Arnott, Guelph (CA); Jonathan Lee, Richmond Hill (CA); Garrett Randall, Waterloo (CA)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/417,083

(22) Filed: Jan. 19, 2024

(65) Prior Publication Data
US 2024/0231958 A1    Jul. 11, 2024

Related U.S. Application Data

(63) Continuation of application No. 17/651,729, filed on Feb. 18, 2022, now Pat. No. 11,893,426.

(51) Int. Cl.
*G06F 3/00* (2006.01)
*G06F 9/54* (2006.01)
*H04L 9/08* (2006.01)

(52) U.S. Cl.
CPC ............. *G06F 9/54* (2013.01); *H04L 9/0838* (2013.01)

(58) Field of Classification Search
CPC ........................................................ G06F 9/54
See application file for complete search history.

(56) References Cited

U.S. PATENT DOCUMENTS 9,584,387 B1 * 2/2017 Cartlidge ................ H04L 43/50
10,048,830 B2    8/2018 Jose et al.
(Continued)

FOREIGN PATENT DOCUMENTS

AU    2020203877 A1    7/2020
DE    2020015009265 U1   1/2017
(Continued)

OTHER PUBLICATIONS

Priyanka Rawat, An End-2-End tunnel header compression solution for nested mobile networks. (Year: 2019).*
(Continued)

*Primary Examiner* — Lechi Truong
(74) *Attorney, Agent, or Firm* — Bookoff McAndrews, PLLC

(57) ABSTRACT

The method may comprise: receiving a data payload and first data; predicting, by a trained machine learning model based on the first data, a path through a plurality of microservices associated with the data payload; generating a modified data payload by modifying, via the orchestrator service, the data payload to include: a first header, wherein the first header comprises a first microservice destination address associated with a first microservice of the plurality of microservices and a second header nested within the first header, wherein the second header comprises a second microservice destination address associated with a second microservice of the plurality of microservices; forwarding the modified data payload to the first microservice based on the first header for processing; and forwarding the modified data payload to the second microservice based on the second header for processing.

20 Claims, 4 Drawing Sheets

(56) References Cited

U.S. PATENT DOCUMENTS

| | | | |
|---|---|---|---|
| 10,230,571 B2 | 3/2019 | Rangasamy et al. | |
| 10,320,813 B1* | 6/2019 | Ahmed | H04L 63/1416 |
| 10,656,929 B2 | 5/2020 | Jamjoom et al. | |
| 10,855,793 B2 | 12/2020 | Mungel et al. | |
| 11,032,150 B2* | 6/2021 | Ma | H04L 41/12 |
| 11,038,716 B2* | 6/2021 | Allan | H04L 61/5084 |
| 11,170,309 B1* | 11/2021 | Stefani | H04L 63/0428 |
| 11,238,376 B1 | 2/2022 | Mudgil et al. | |
| 2001/0055317 A1 | 12/2001 | Kajizaki et al. | |
| 2003/0093691 A1* | 5/2003 | Simon | H04L 63/164 |
| | | | 726/4 |
| 2004/0208175 A1* | 10/2004 | McCabe | H04L 45/04 |
| | | | 709/245 |
| 2006/0143361 A1* | 6/2006 | Kottapalli | G06F 12/0857 |
| | | | 711/E12.039 |
| 2006/0218111 A1* | 9/2006 | Cohen | G06Q 10/10 |
| | | | 707/999.005 |
| 2007/0113232 A1* | 5/2007 | Collard | G06F 9/52 |
| | | | 718/101 |
| 2010/0265863 A1* | 10/2010 | Cordeiro | H04W 52/0225 |
| | | | 370/328 |
| 2011/0258630 A1* | 10/2011 | Fee | G06F 9/4843 |
| | | | 718/101 |
| 2017/0264493 A1* | 9/2017 | Cencini | H04L 67/12 |
| 2017/0329596 A1* | 11/2017 | Butler | G06F 8/65 |
| 2019/0123934 A1* | 4/2019 | Magganmane | H04L 61/2514 |
| 2019/0124011 A1* | 4/2019 | Voleti | H04L 67/1044 |
| 2019/0279102 A1* | 9/2019 | Cataltepe | G06F 16/24568 |
| 2019/0294449 A1 | 9/2019 | Leon et al. | |
| 2019/0340490 A1* | 11/2019 | Fishel | G06N 3/08 |
| 2020/0162856 A1* | 5/2020 | Ziv | H04W 4/08 |
| 2020/0382537 A1 | 12/2020 | Compton | |
| 2020/0396225 A1 | 12/2020 | Bhatia et al. | |
| 2021/0303477 A1* | 9/2021 | Doshi | G06F 12/0817 |
| 2022/0187847 A1 | 6/2022 | Cella et al. | |
| 2022/0209909 A1* | 6/2022 | Chandrasekher | H04L 5/0048 |
| 2022/0358110 A1* | 11/2022 | Zhang | G06F 16/9027 |

FOREIGN PATENT DOCUMENTS

| | | | | |
|---|---|---|---|---|
| DE | 202015009265 U | * | 1/2019 | |
| JP | 2005071109 A | * | 3/2005 | G06F 9/522 |

OTHER PUBLICATIONS

Faqir Zarrar Yousaf, NERON: A Route Optimization Scheme for Nested Mobile Networks. (Year: 2009).*

Faisal M. Cheema, Comparative Evaluation of Header vs. Payload based Network Anomaly Detectors . (Year: 2009).*

Amos Kingatua, "13 Best Practices to Secure Microservices," Geekflare.com, Sep. 10, 2020, [https:1/geekflare.com/securing-microservices/] (14 pages).

Douma Bouthiba Farouq, Unidirectional and Bidirectional Optimistic Modes IP Header Compression for Real-Time Video Streaming. (Year: 2020).

Pedro Amaral, Machine Learning in Software Defined Networks: Data Collection and Traffic Classification. (Year: 2016).

Wei Li, A Machine Learning Approach for Efficient Traffic Classification. (Year: 2007).

* cited by examiner

SYSTEMS AND METHODS FOR ROUTING DATA PAYLOADS THROUGH A PLURALITY OF MICROSERVICES USING MACHINE LEARNING

CROSS-REFERENCE TO RELATED APPLICATION(S)

This patent application is a continuation of and claims the benefit of priority to U.S. Nonprovisional patent application Ser. No. 17/651,729, filed on Feb. 18, 2022, the entirety of which is incorporated herein by reference.

TECHNICAL FIELD

Various embodiments of this disclosure relate generally to machine-learning-based techniques for microservice management and, more particularly, to systems and methods for routing data payloads through a plurality of microservices in a cloud environment using machine learning.

BACKGROUND

Microservices are commonly understood as modular software components or "mini-applications." While typical applications are complex and often perform multiple different functions, microservices typically perform a single function. Microservices are generally called by using Application Programming Interfaces (APIs), and each microservice may communicate with other microservices using APIs. The microservice architecture has many known benefits, including for example the ability to scale, repair, update, remove, and/or add microservices independently of one another. Microservices may further be implemented via cloud computing or even using server-less computing methods such as Amazon® Web Services (AWS) lambda.

In certain circumstances, a series of microservices may be chained together and deployed together when called for a specific purpose, such as data record processing. For example, when a record is received, a corresponding series of microservices may be loaded, and the record may be sent to the first microservice to perform or solve a common task (e.g., find an email address associated with an account for the record). The record may then be passed on or output to other microservices on the chain (e.g. perform other tasks such as sending an email to the email address associated with the account or found by the first microservice). In these situations, when multiple records are received, multiple chains of microservices may be loaded in parallel, including multiple deployments of common microservices. Multiple instances of the same microservice may be deployed, which may in turn result in an increased architectural footprint as well as excessive server costs, engineering and maintenance overhead, and other costs. Additionally, in a conventional solution in which hardcoded or defined architecture is deployed, each record needs to be processed by every microservice on the chain, even if that particular microservice's processing is not required. Further, a service in a hardcoded chain may typically need to make multiple calls to microservices on the chain, resulting in increased overall network usage.

One possible prior solution is to extensively hardcode each microservice to be able to output to multiple endpoints and to compute which endpoint should be produced at run time. This has significant implementation costs due to the specific coding need for each microservice, and further, this solution may not be extendable to all use cases. In addition, a web-style pipeline is produced, which may be difficult to maintain and follow, and is further not flexible for responding to future use cases, for example, where the output is undecided or if multiple additional outputs are added. Thus, conventional techniques, including the foregoing, fail to provide a more flexible and efficient use of network resources in microservices architecture.

This disclosure is directed to addressing above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, methods and systems are disclosed for routing data payloads through a plurality of microservices using machine learning.

In one aspect, an exemplary embodiment of a method for routing data payloads through a plurality of microservices using a trained machine-learning may include: receiving, by one or more processors via an orchestrator service, a data payload and first data that includes information regarding the data payload; predicting, by a trained machine learning model executed by the one or more processors and based on the first data, a path through a plurality of microservices associated with the data payload, wherein the trained machine learning model is trained based on (i) second data that includes one or more prior data payloads and prior feedback data as test data and (ii) third data that includes one or more prior microservices corresponding to the one or more prior data payloads, to learn associations between the test data and the corresponding prior feedback data for each of the one or more prior data payloads, such that the trained machine learning model is configured to determine a path through the plurality of microservices associated with the data payload in response to input of the first data and the data payload; generating a modified data payload by modifying, by the one or more processors via the orchestrator service, the data payload to include: a first header, wherein the first header comprises a first microservice destination address associated with a first microservice of the plurality of microservices; and a second header nested within the first header, wherein the second header comprises a second microservice destination address associated with a second microservice of the plurality of microservices; forwarding, by the one or more processors via the orchestrator service, the modified data payload to the first microservice based on the first header, such that the modified data payload is processed by the first microservice; and forwarding, by the one or more processors via the first microservice, the modified data payload output by the first microservice to the second microservice based on the second header, such that the modified data payload is processed by the second microservice.

In another aspect, an exemplary embodiment of a method for routing data payloads through a plurality of microservices using a trained machine-learning may include: receiving, by one or more processors via an orchestrator service, a data payload and first data that includes information regarding the data payload; predicting, by a trained machine learning model executed by the one or more processors and based on the first data, a path through a plurality of microservices associated with the data payload, wherein the trained machine learning model is trained based on (i)

second data that includes one or more prior data payloads and prior feedback data as test data and (ii) third data that includes one or more prior microservices corresponding to the one or more prior data payloads, to learn associations between the test data and the corresponding prior feedback data for each of the one or more prior data payloads, such that the trained machine learning model is configured to determine a path through a plurality of microservices associated with the data payload in response to input of the first data and the data payload; generating a modified data payload by modifying, by the one or more processors via the orchestrator service, the data payload to include: a first header, wherein the first header comprises a first microservice destination address associated with a first microservice of the plurality of microservices; and a second header nested within the first header, wherein the second header comprises a second microservice destination address associated with a second microservice of the plurality of microservices; forwarding, by the one or more processors via the orchestrator service, the modified data payload to the first microservice based on the first header, such that the modified data payload is processed by the first microservice; forwarding, by the one or more processors, via the first microservice, the modified data payload output by the first microservice to the second microservice based on the second header, such that the modified data payload is processed by the second microservice; receiving, by the one or more processors, a second data payload; and forwarding, by the one or more processors, the second data payload to a second orchestrator service.

In a further aspect, an exemplary embodiment of a system for routing data payloads through a plurality of microservices using a machine-learning model may include: a memory storing instructions; and a processor operatively connected to the memory and configured to execute the instruction to perform a process. The process may include: receiving, via an orchestrator service, a data payload; receiving, via the orchestrator service, first data that includes information regarding the data payload; determining a path through a plurality of microservices associated with the data payload based on the first data; generating a modified data payload by modifying, via the orchestrator service, the data payload to include: a first header, wherein the first header comprises a first microservice destination address associated with a first microservice of the plurality of microservices; and a second header nested within the first header, wherein the second header comprises a second microservice destination address associated with a second microservice of the plurality of microservices, to generate a modified data payload; forwarding, via the orchestrator service, the modified data payload to the first microservice based on the first header, such that the modified data payload is processed by the first microservice; and forwarding, via the first microservice, the modified data payload output by the first microservice to the second microservice based on the second header, such that the modified data payload is processed by the second microservice.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
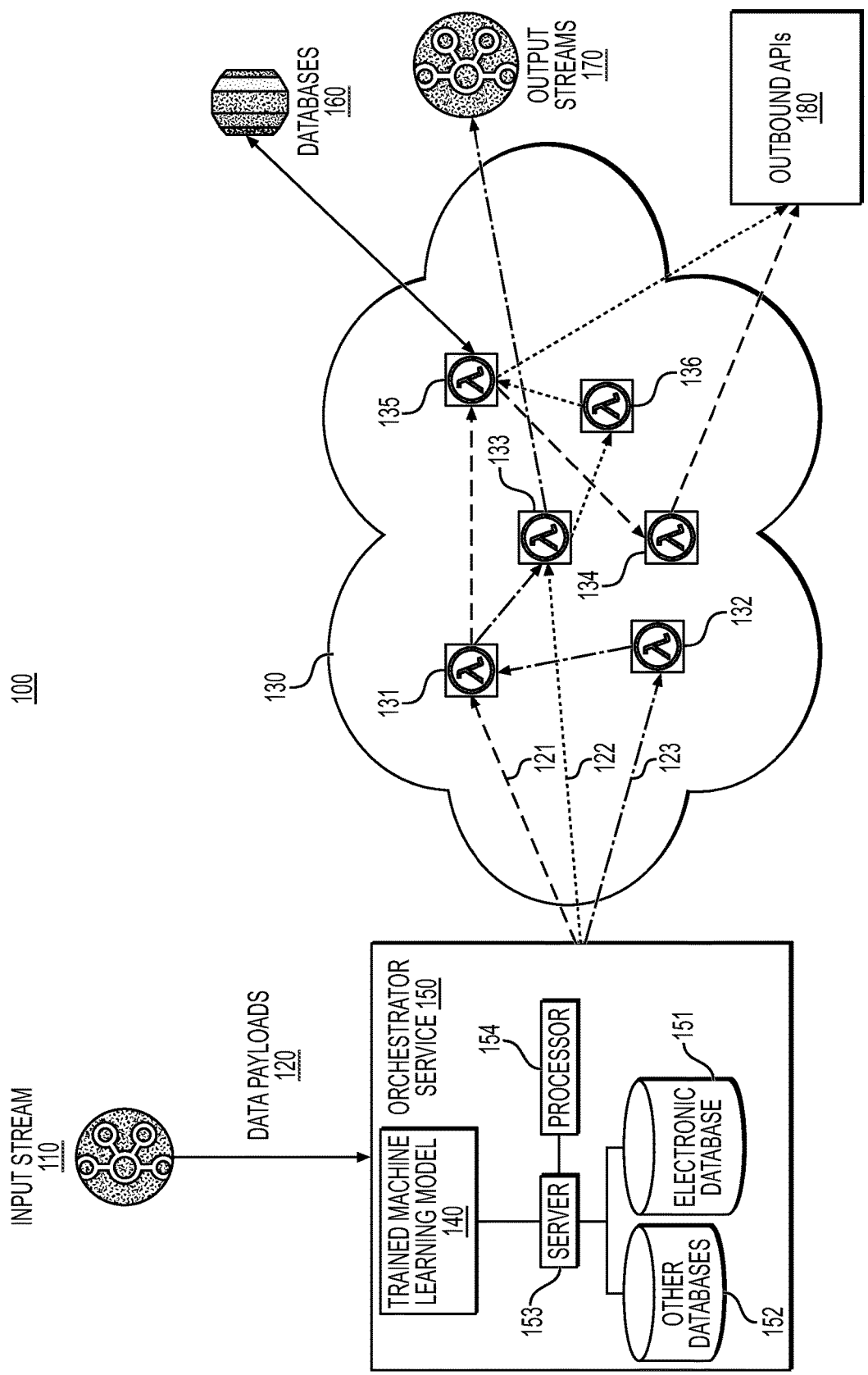
FIG. 1 depicts an exemplary environment for using a trained machine-learning model to route data payloads through one or more microservices, according to one or more embodiments.

According to certain aspects of the disclosure, methods and systems are disclosed for routing data payloads through a plurality of microservices in a cloud environment and, in particular, techniques using machine learning, e.g., modifying data payloads via an orchestrator to include header information for routing the data payloads to optimal microservices. Microservice chains are typically called to process data payloads from a data stream before sending those data payloads on to other destinations (e.g., another data stream, a database, or to another API). However, conventional techniques may not be suitable. For example, conventional techniques may be inefficient, difficult to implement, or result in increased data usage and costs. Accordingly, improvements in technology relating to routing data payloads through a plurality of microservices in a cloud environment using machine learning are needed.

As will be discussed in more detail below, in various embodiments, systems and methods are described for using machine learning to route data payloads through a plurality of microservices in a cloud environment via an orchestrator service. By training a machine-learning model, e.g., via supervised or semi-supervised learning, to learn associations between prior data payload and feedback data and prior microservices and corresponding data payloads data, the trained machine-learning model may be usable with an orchestrator to format and route data payloads to optimal microservices for processing. Such a solution may avoid g costs associated with one or more of duplicative microservices, excessive numbers of API calls, or hardcoded routing methods.

Reference to any particular activity is provided in this disclosure only for convenience and not intended to limit the disclosure. A person of ordinary skill in the art would recognize that the concepts underlying the disclosed devices and methods may be utilized in any suitable activity. The disclosure may be understood with reference to the following description and the appended drawings, wherein like elements are referred to with the same reference numerals.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. The term "or" is used disjunctively, such that "at least one of A or B" includes, (A), (B), (A and A), (A and B), etc. Relative terms, such as, "substantially" and "generally," are used to indicate a possible variation of +10% of a stated or understood value.

Terms like "provider," "merchant," "vendor," or the like generally encompass an entity or person involved in providing, selling, and/or renting items to persons such as a seller, dealer, renter, merchant, vendor, or the like, as well as an agent or intermediary of such an entity or person. An "item" generally encompasses a good, service, or the like having ownership or other rights that may be transferred. As used herein, terms like "user" or "customer" generally encompasses any person or entity that may desire information, resolution of an issue, purchase of a product, or engage in any other type of interaction with a provider. The term "browser extension" may be used interchangeably with other terms like "program," "electronic application," or the like, and generally encompasses software that is configured to interact with, modify, override, supplement, or operate in conjunction with other software. As used herein, terms such as "microservice" or the like generally encompass any modular software component or mini-application that performs functions or operations on data and communicates via APIs. As used herein, terms such as "data payload" or the like generally encompass any record, file, or other data that may be processed by a microservice.

As used herein, a "machine-learning model" generally encompasses instructions, data, and/or a model configured to receive input, and apply one or more of a weight, bias, classification, or analysis on the input to generate an output. The output may include, for example, a classification of the input, an analysis based on the input, a design, process, prediction, or recommendation associated with the input, or any other suitable type of output. A machine-learning model is generally trained using training data, e.g., experiential data and/or samples of input data, which are fed into the model in order to establish, tune, or modify one or more aspects of the model, e.g., the weights, biases, criteria for forming classifications or clusters, or the like. Aspects of a machine-learning model may operate on an input linearly, in parallel, via a network (e.g., a neural network), or via any suitable configuration.

The execution of the machine-learning model may include deployment of one or more machine learning techniques, such as linear regression, logistical regression, random forest, gradient boosted machine (GBM), deep learning, and/or a deep neural network. Supervised and/or unsupervised training may be employed. For example, supervised learning may include providing training data and labels corresponding to the training data, e.g., as ground truth. Unsupervised approaches may include clustering, classification or the like. K-means clustering or K-Nearest Neighbors may also be used, which may be supervised or unsupervised. Combinations of K-Nearest Neighbors and an unsupervised cluster technique may also be used. Any suitable type of training may be used, e.g., stochastic, gradient boosted, random seeded, recursive, epoch or batch-based, etc.

In an exemplary use case, an orchestrator service may be used to route a data payload through a plurality of microservices. The orchestrator may insert or append a header and one or more additional nested headers into one or more data payloads. The header may contain routing information including destination addresses for each microservice that is required to process the data payload. In this manner, the data payload will automatically be routed to only the microservices identified in the headers. In this manner, each data payload will only be routed to necessary microservices. Further, when multiple payloads need to be processed, only a single chain of microservices needs to be called, and that single chain of microservices can process multiple different payloads that are routed through the microservices. In this manner, no duplicate instances of any microservice are required. In some embodiments, additional orchestrators may be used to route other types of data payloads through the plurality of microservices.

In another exemplary use case, a machine-learning model may be trained to predict the microservices which a data payload should be forwarded to. For example, feedback data may be provided to prior data payloads that were processed by a plurality of microservices. The feedback data may be used to generate a feedback score. For example, a high feedback score may correspond to a positive review or positive customer or user feedback following the processing of the data payload. For example, a microservice may automatically send an email related to the data payload to a customer at a specific time. If the user appreciated the email or found it helpful and/or left a positive review, then a positive feedback score may be generated. On the other hand, a low feedback score may correspond to a negative review or negative customer experience. Based on the feedback scores, a machine learning engine may be trained to receive data payloads, analyze past data for similarities with prior data payloads, and determine an optimal route through the microservices in order to generate a positive feedback score. In this manner, machine learning may be used to further optimize the data payload routing process to increase efficiency and reduce data usage and costs.

While several of the examples above involve data payloads comprising records, it should be understood that techniques according to this disclosure may be adapted to any suitable type of data payload. It should also be understood that the examples above are illustrative only. The techniques and technologies of this disclosure may be adapted to any suitable activity.

Presented below are various aspects of machine learning techniques that may be adapted to route data payloads through a plurality of microservices in a cloud environment via an orchestrator service. As will be discussed in more detail below, machine learning techniques adapted to predict optimal microservices for a data payload may include one or more aspects according to this disclosure, e.g., a particular selection of training data, a particular training process for the machine-learning model, operation of a particular device suitable for use with the trained machine-learning model, operation of the machine-learning model in conjunction with particular data, modification of such particular data by the machine-learning model, etc., and/or other aspects that may be apparent to one of ordinary skill in the art based on this disclosure.

FIG. 1 depicts an exemplary environment that may be utilized with techniques presented herein. Environment 100 may include one or more data input streams 110, one or more databases 160, one or more data output streams 170, or one or more outbound APIs 180, may communicate across an electronic network 130. The one or more data input streams 110 may be existing data streams, such as Kinesis, Kafka Streams, simple notification stream (SNS), and so forth. The electronic network 130 may further include a plurality of microservices 131-136. Each microservice of the plurality of microservices 131-136 may perform a specific function. For example, in the context of online shopping, each microservice may perform a different function, for example, calling an account, generating a product recommendation, processing a payment, cataloging an item for purchase, and so forth. As will be discussed in further detail below, an orchestrator service 150 may communicate with one or more of the other components of the environment 100 across electronic network 130. The one or more data input streams 110 may include a plurality of data payloads. Data payload may be, for example, the body of a Representational State Transfer (REST) post request. A data payload of one or more data payloads 120 may be received from the one or more data input streams 110 by an orchestrator service 150. The data payload may be modified by the orchestrator service 150 as described below with respect to FIGS. 2-3. A path may be generated through the plurality of microservices for a data payload. For example, the orchestrator service may direct a data payload of the one or more data payloads 120 through a path 121 (dashed line arrows), such that the data payload is first processed by microservice 131, then microservice 135, then microservice 134, before then be forwarded to one or more about outbound APIs 180. In some embodiments, microservice 135 may store data associated with the data payload in one or more databases 160. In another embodiment, the orchestrator service 150 may direct a data payload of the one or more data payloads 120 through a path 122 (dotted line arrows), such that the data payload is first processed by microservice 133, then microservice 136, then microservice 135, and then forwarded to one or more outbound APIs 180. In another embodiment, the orchestrator service may direct a data payload of the one or more data payloads 120 through a path 123 (dash-dot line arrows), such that the data payload is first processed by microservice 132, then by microservice 131, and then by microservice 133, before being directed to one or more data output streams 170. Each of paths 121 through 123 signify a different route through the microservices such that different data payloads may be processed in different ways. For example, a certain data payload might not need to be processed by microservice 131, microservice 132, or microservice 134. Accordingly, the orchestrator service 150 can determine the appropriate routing, for example, path 122, and then modify or insert a header into a data payload of the one or more data payloads 120 as described further below with respect FIGS. 2-3 to follow path 122. While paths 121-123 are disclosed herein, any number of paths are possible based on the determination of the orchestrator service 150. In this manner, duplicate or redundant microservices are not necessary, and further, each data payload may be automatically forwarded to the next microservice on the path without need for additional calls or instructions from the orchestrator service 150 or another device or system.

The orchestrator service 150 may comprise a server 153, a processor 154, an electronic database 151, other databases 152, and a trained machine learning model 140. The trained machine learning model may be trained based on data as described above and further below with respect to FIGS. 2-3 for routing a data payload through a plurality of microservices.

In some embodiments, the components of the environment 100 are associated with a common entity, e.g., a financial institution, transaction processor, merchant, or the like. In some embodiments, one or more of the components of the environment is associated with a different entity than another. The systems and devices of the environment 100 may communicate in any arrangement. As will be discussed herein, systems and/or devices of the environment 100 may communicate in order to one or more of generate, train, or use a machine-learning model to route a data payload through a plurality of microservices, among other activities.

The orchestrator service 150 may be a computer system such as, for example, a desktop computer, a mobile device, a server, a tablet, etc. In some embodiments, the orchestrator service 150 may include one or more electronic application(s), e.g., a program, plugin, browser extension, etc., installed on a memory of the orchestrator service 150. In some embodiments, the electronic application(s) may be associated with one or more of the other components in the environment 100. For example, the electronic application(s) may include one or more of system control software, system monitoring software, software development tools, etc. In some embodiments, the orchestrator service 150 may not have any dedicated physical components, but may instead be implemented as software in a cloud computing environment.

Each of electronic database 151, other databases 152, and one or more databases 160 may include a server system, an electronic medical data system, computer-readable memory such as a hard drive, flash drive, disk, etc. In some embodiments, each of electronic database 151, other databases 152, and one or more databases 160 includes and/or interacts with an application programming interface for exchanging data to other systems, e.g., one or more of the other components of the environment. The electronic database 151, other databases 152, and one or more databases 160 may include and/or act as a repository or source for data associated with a data payload. For example, feedback data, as discussed in more detail below.

In various embodiments, the electronic network 130 may be a wide area network ("WAN"), a local area network ("LAN"), personal area network ("PAN"), or the like. In some embodiments, electronic network 130 includes the Internet, and information and data provided between various systems occurs online. "Online" may mean connecting to or accessing source data or information from a location remote from other devices or networks coupled to the Internet. Alternatively, "online" may refer to connecting or accessing an electronic network (wired or wireless) via a mobile communications network or device. The Internet is a worldwide system of computer networks-a network of networks in which a party at one computer or other device connected to the network can obtain information from any other computer and communicate with parties of other computers or devices. The most widely used part of the Internet is the World Wide Web (often-abbreviated "WWW" or called "the Web"). A "website page" generally encompasses a location, data store, or the like that is, for example, hosted and/or operated by a computer system so as to be accessible online, and that may include data configured to cause a program such as a web browser to perform operations such as send, receive, or process data, generate a visual display and/or an interactive interface, or the like.

As discussed in further detail below, the orchestrator service 150 may one or more of (i) generate, store, train, or use a machine-learning model configured to route data payloads, such as a data payload of the one or more data payloads 120, through a plurality of microservices, such as one or more of Microservices 131-136 before then routing the data payloads to a non-microservice destination, such as one or more data output streams 170, one or more outbound APIs 180, or stored on one or more databases 160. The orchestrator service 150 may include a machine-learning model and/or instructions associated with the machine-learning model, e.g., instructions for generating a machine-learning model, training the machine-learning model, using the machine-learning model etc. The orchestrator service 150 may include instructions for retrieving data associated with a data payload, and/or adjusting data, e.g., based on the output of the machine-learning model. The orchestrator service 150 may include training data, e.g., data associated with a data payload, and may include ground truth, e.g., feedback data.

In some embodiments, a system or device other than the orchestrator service 150 is used to generate and/or train the machine-learning model. For example, such a system may include instructions for generating the machine-learning model, the training data and ground truth, and/or instructions for training the machine-learning model. A resulting trained-machine-learning model may then be provided to the orchestrator service 150.

Generally, a machine-learning model includes a set of variables, e.g., nodes, neurons, filters, etc., that are tuned, e.g., weighted or biased, to different values via the application of training data. In supervised learning, e.g., where a ground truth is known for the training data provided, training may proceed by feeding a sample of training data into a model with variables set at initialized values, e.g., at random, based on Gaussian noise, a pre-trained model, or the like. The output may be compared with the ground truth to determine an error, which may then be back-propagated through the model to adjust the values of the variable.

Training may be conducted in any suitable manner, e.g., in batches, and may include any suitable training methodology, e.g., stochastic or non-stochastic gradient descent, gradient boosting, random forest, etc. In some embodiments, a portion of the training data may be withheld during training and/or used to validate the trained machine-learning model, e.g., compare the output of the trained model with the ground truth for that portion of the training data to evaluate an accuracy of the trained model. The training of the machine-learning model may be configured to cause the machine-learning model to learn associations between data payload data and feedback data, such that the trained machine-learning model is configured to determine an output path through a plurality of microservices in response to the input data payload data based on the learned associations.

For example, in some embodiments, the machine-learning model of the orchestrator service 150 may include a Recurrent Neural Network ("RNN"). Generally, RNNs are a class of feed-forward neural networks that may be well adapted to processing a sequence of inputs. In some embodiments, the machine-learning model may include a Long Short Term Memory ("LSTM") model and/or Sequence to Sequence ("Seq2Seq") model. An LSTM model may be configured to generate an output from a sample that takes at least some previous samples and/or outputs into account.

Although depicted as separate components in FIG. 1, it should be understood that a component or portion of a component in the environment 100 may, in some embodiments, be integrated with or incorporated into one or more other components. For example, the orchestrator service 150 may be integrated with the one or more databases 160. In some embodiments, operations or aspects of one or more of the components discussed above may be distributed amongst one or more other components. Any suitable arrangement and/or integration of the various systems and devices of the environment 100 may be used.

Further aspects of the machine-learning model and/or how it may be utilized to route data payloads through a plurality of microservices are discussed in further detail in the methods below. In the following methods, various acts may be described as performed or executed by a component from FIG. 1, such as the orchestrator service 150, or components thereof. However, it should be understood that in various embodiments, various components of the environment 100 discussed above may execute instructions or perform acts including the acts discussed below. An act performed by a service may be considered to be performed by a processor, actuator, device, or the like associated with that service. Further, it should be understood that in various embodiments, various steps may be added, omitted, and/or rearranged in any suitable manner.

Figure 2:
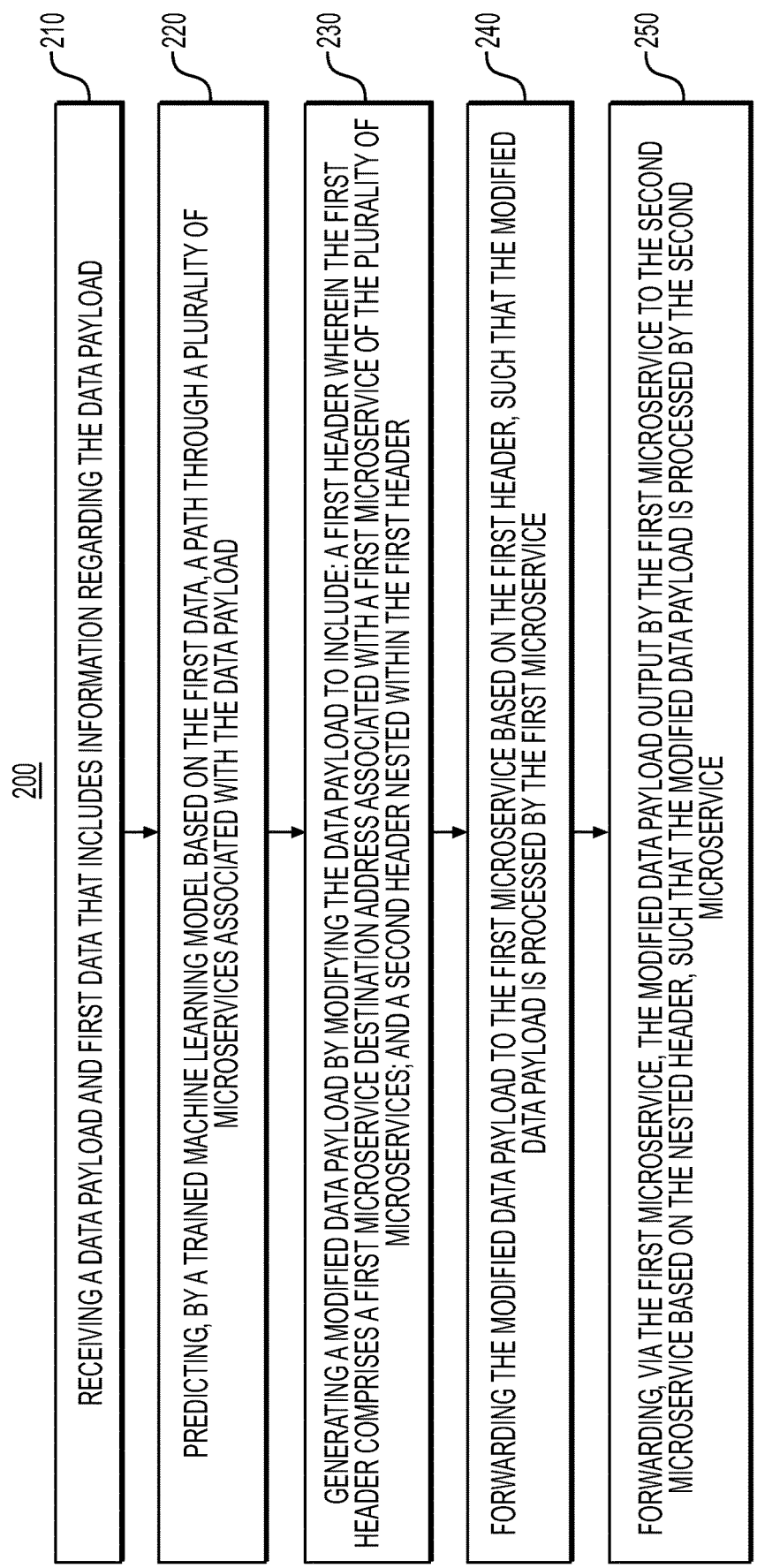
FIG. 2 depicts a flowchart of another exemplary method of using a trained machine-learning model to route data payloads through one or more microservices, according to one or more embodiments.

FIG. 2 illustrates an exemplary process 200 for using a trained machine-learning model to route data payloads through one or more microservices, such as in the various examples discussed above. At step 210, the orchestrator service 150 receives a data payload and first data that includes information regarding the data payload. A data payload may be, for example, a record associated with one or more customers. While a record is used as exemplary herein, the data payload may be any type of data that may be processed by one or more microservices, for example, an online shopping request. The first data may be data that includes information regarding the data payload separate from the payload itself. For example, in the context of a record, the data payload may be the data record itself, while information regarding the data payload may be metadata such as time stamps, source addresses, user accounts, or any other information associated with the data payload.

At step 220, a path through a plurality of microservices may be determined by the orchestrator service 150 for the data payload. In some embodiments, a trained machine learning model 140 of the orchestrator service 150 may predict or determine an optimal path through a plurality of microservices associated with the data payload. In some embodiments, the trained machine learning model 140 is based on test data that includes prior data payloads and prior feedback test data. For example, the trained machine learning may determine that a data payload of the one or more data payloads 120 is similar or identical to prior data payloads that have previously been processed and routed through a plurality of microservices. For example, the prior data payloads may be of the same type or comprise the same information associated with customers, for example, a request to log in to an online bank account. In some embodiments, a feedback score is associated with the prior data payload and the prior path. For example, the score can be between 1 and 10, where 1 is a low feedback score indicating poor performance, and with 10 being a high feedback score indicating a high performance. A feedback score in some embodiments may be generated automatically or by a user or customer survey or input. As an example, a prior data payload may have been directed through path 121.

Afterwards, a feedback score may be associated with that prior data payload and path 121, for example, a 1, indicating that the path for that prior data payload was not optimal. Another similar prior data payload may have been directed through path 123. Afterwards, a feedback score may be associated with that prior data payload and path 123, for example, a 7, indicating a higher performance. Additional data may then be provided to the trained machine learning model, including the specific microservices corresponding to the prior data payloads. For example, data related to the microservices on the path 121 and path 123 for the prior data payloads. For example, the trained machine learning model will take into account that path 121 included microservices 131, 134, and 135, while path 123 included microservices 132, 131, 133. In some embodiments, the data will also include information on the order in which the prior data payload were processed by the microservices as well as the resulting outputs after the prior data payloads were processed, for example, whether the prior data payload was saved on one or more databases 160, sent to one or more data output streams 170, or send to one or more outbound APIs 180. Thus, the trained machine learning model 140 may be trained using this prior information to determine a more optimal route through a plurality of microservices for similar data payloads. Based on the feedback scores and prior paths, the trained machine learning model 140 learns relationships and associates between the test data and the corresponding prior feedback data for each of the one or more prior data payloads, such that the trained machine learning model is configured to determine a path through the plurality of microservices associated with the data payload in response to input of one or more data payloads 120 and corresponding data associated with the data payloads 120. While a feedback score is described herein, other types of data other than scores may be used. For example, the trained machine learning model 140 may be trained to review qualitative feedback (e.g. natural language statements such as "good job" or "this was horrible" or "took too long") to then generate future pathing. In some embodiments, feedback may be received from an automated source. For example, it may be determined that the prior data payload does not meet the necessary requirements to be processed by a microservice, or is incorrectly formatted or otherwise is missing data that would be required in order for that data payload to be processed by a microservice. In some embodiments, the microservice itself can provide a feedback score or feedback data indicating that a data payload could not be processed. In some embodiments, another component or output device may automatically monitor the microservices and determine feedback scores for prior data payloads.

At step 230, the orchestrator service may generate a modified data payload. For example, after receiving a data payload of the one or more data payloads 120 and determining a path, the orchestrator service 150 may further insert or modify the data payload to include a header. The header may include one or more microservice destination addresses and be formatted such that it may be processed and read by one or more microservices. For example, the orchestrator service 150 may generate the modified data payload by adding a header with a destination address for microservice 131 and a second header nested within the first header that includes a destination for a second microservice of a plurality of microservices, such as microservice 132. Additional headers with additional microservices may be nested within the header. In this manner, headers and nested headers may be inserted into a data payload of the one or more data payloads 120 to generate a modified data payload such that the modified data payload will follow a path through a plurality of microservices. For example, an orchestrator service 150 may insert a first header with a destination address for microservice 131, a second header with a destination address for microservice 135 nested in the first header, a third header with a destination address for microservice 134 nested in the first or second header, and then a fourth header with a destination address for one or more outbound APIs 180 nested in the first, second, or third header.

At step 240, the modified data payload may be transmitted to a first microservice based on the destination address in the header. In some embodiments, the first microservice may be called by the orchestrator service 150 based on the header. The first microservice may then process the modified data payload as described above. For example, the first microservice might provide a function for finding an email address associated with an account associated with the modified data payload. As another example, the first microservice may filter data within the modified data payload, for example, by removing or hiding certain aspects of information that may be less relevant. As an additional example, the first microservice may insert additional data into the modified data payload, such as inserting an email address, account balance, account number, or other information relevant for processing the modified data payload. As another example, the first microservice may generate a message associated with the modified data payload, for example, after processing the data, the first microservice may send an electronic message, text, or push notification to a user or system administrator indicating that the modified data payload is being processed. At step 250, after processing the modified data payload, the modified data payload, based on the nested header (e.g., the second header), will automatically be transmitted to the next microservice based on the destination address in the second header. In some embodiments, the first microservice may call the second microservice based on the nested header, and thus may avoid the need for the orchestrator service 150 to call the second microservice. For example, after processing, the header may be modified such that only one or more nested headers remain. The modified data payload may then be processed by the second microservice. Using the example described above, after processing by microservice 131, the modified data payload may automatically be forwarded to microservice 135. After processing by the second microservice, the modified data payload may again be forwarded to a third microservice based on the next nested header, for example, microservice 134. After processing at microservice 134, based on the next nested header (e.g., the third header), the modified data payload may then be forward to another microservice or to another destination. For example, after the modified data payload is processed by microservices 131, 135, and 134, the modified data payload may be forwarded to an endpoint that is not a microservice, for example, one or more databases 160, one or more data output streams 170 (such as logging outboard Kafka streams), or one or more outbound APIs 180. In this manner, the orchestrator service can generate a modified data payload that will follow a path, for example, path 121 as described above, by modifying the data payload to include headers and nested headers.

While headers are described herein, other methods for labeling, attaching, or labeling a data payload of the one or more data payloads 120 to generate a modified data payload may be used. For example, instead of inserting a header, the destination addresses may be inserted into another data component of the data payload. In this manner, the number of API calls made may also be reduced, as the orchestrator service need not individually call each microservice for processing.

In some embodiments, additional data payloads may be received and processed in a similar manner as described above to generate additional modified data payloads. For example, the orchestrator service 150 may further generate a second modified data payload by modifying the second data payload to include a second data payload header, wherein the second data payload header comprises the first microservice destination address associated with the first microservice of the plurality of microservices and an additional data payload header nested within the second data payload header, wherein the additional data payload header comprises a third microservice destination address associated with a third microservice, to generate a modified second data payload. In some embodiments, the modified second data payload may then be forwarded through a path through the plurality of microservices as described above, for example, one of paths 121-123. As such, a consistent communication protocol is developed that improves processing of data payloads through a plurality of microservices.

Additionally, in some systems, multiple orchestrators may be implemented as described above. In some embodiments, each orchestrator may rely on different resources and/or be selected or assigned to process different types of payloads in parallel, while still routing the data payloads through the same plurality of microservices. These orchestrators may further consume different resources in some embodiments. In this manner, data payloads may be passed through a microservice data pipeline without having to hardcode the structure and order of the microservice pipeline, allowing for a more flexible and efficient solution to prior methods. Thus, in some embodiments, the orchestrator service 150 can decide on a different order for the microservices to be hit for different intents for data payloads, while not requiring multiple separate pipelines to be created or identical microservices architecture to be deployed multiple times.

Traditional firewalls may further be insufficient to adequately protect microservice architectures due to the large number of APIs and microservices, especially in a cloud computing environment. Accordingly, the modified data payload in some embodiments may be encrypted by one or more known methods, including, for example, Data Encryption Standard (DES); Triple DES; Advanced Encryption Standard (AES); Rivest-Shamir-Adleman (RSA); Twofish; Blowfish; Threefish; ElGamal; International Data Encryption Algorithm (IDEA); Rivest cipher 6 (RC6); Elliptic Curve Cryptography; or Diffie-Hellman. In some embodiments, the orchestrator service 150 may operate as an API gateway to limit access to the plurality of microservices. Utilizing the methods implemented herein, by reducing the number of microservice calls necessary, enhanced security for the entire architecture is further provided.

Figure 3:
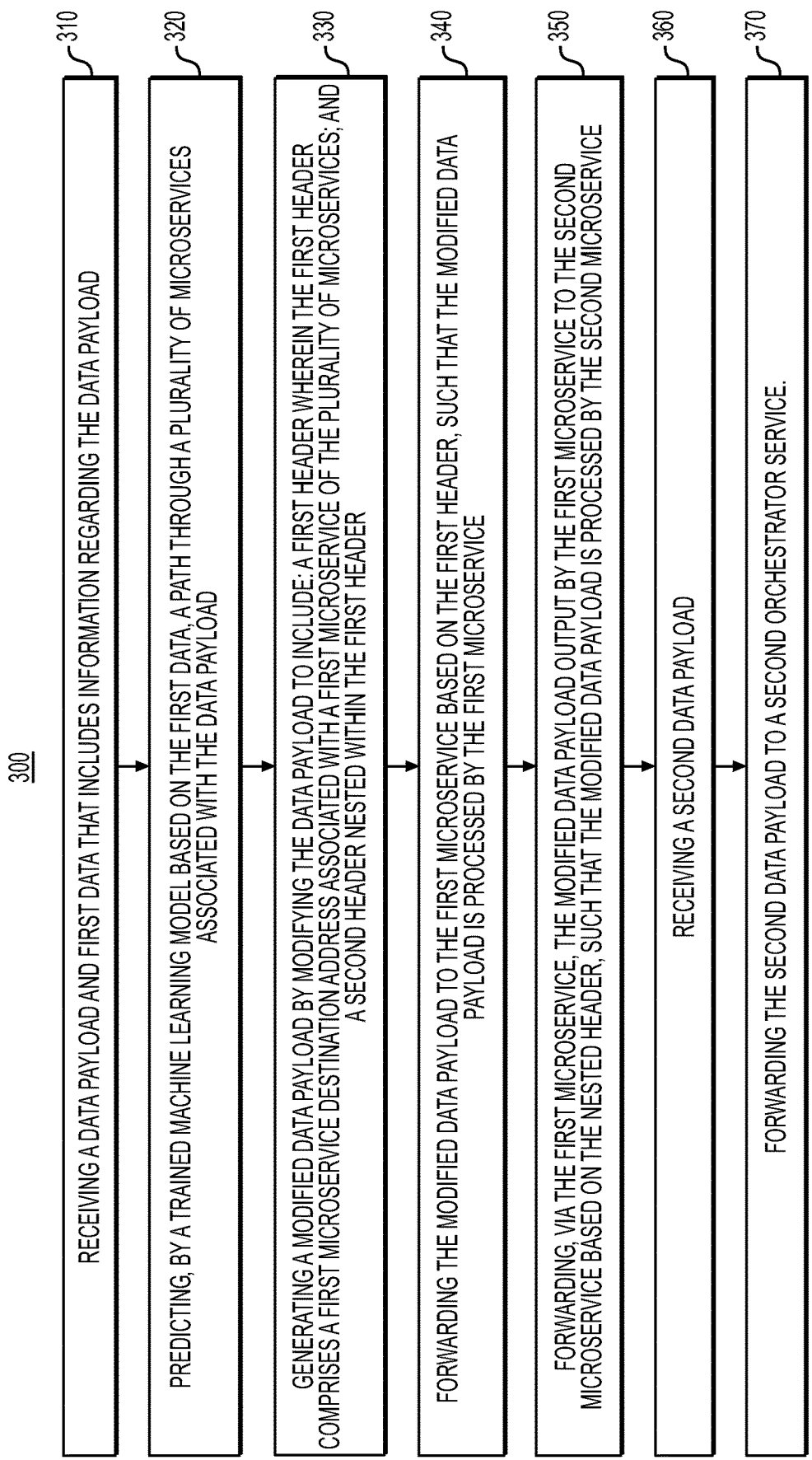
FIG. 3 depicts a flowchart of another exemplary method of using a trained machine-learning model to route data payloads through one or more microservices, according to one or more embodiments.

FIG. 3 illustrates another exemplary process 300 for using a trained machine-learning model to route data payloads through one or more microservices, such as in the various examples discussed above. At step 310, the orchestrator service 150 receives a data payload and first data that includes information regarding the data payload as described above with respect to step 210 of FIG. 2. At step 320, trained machine learning model 140 of the orchestrator service 150 may predict or determine an optimal path through a plurality of microservices associated with the data payload as described above with respect to step 220 of FIG. 2. At step 330, the orchestrator service 150 may generate a modified data payload as described above with respect to step 230 of FIG. 3. At step 340, the modified data payload may be transmitted to a first microservice based on the destination address in the header as described above with respect to step 240 of FIG. 2. At step 350, after processing the modified data payload, the modified data payload, based on the nested header, will automatically be transmitted to the next microservice based on the destination address in the nested header as described above with respect to step 250. At step 360, the orchestrator service 150 may receive a second data payload. The orchestrator service 150 may analyze the second data payload and determine whether or not the second data payload should be modified by the orchestrator service 150 or a second different orchestrator service based on data associated with the first and second data payloads. For example, the orchestrator service 150 may determine that the second data payload is of a different type than what that orchestrator service 150 would process. Upon determining that the second data payload should be sent to another orchestrator service, at step 370, the orchestrator service 150 may forward the second data payload to the second orchestrator service. In some embodiments, a separate processing service may be used to process data payloads to determine which orchestrator a particular data payload should be sent to, and then forward that data payload directly to the relevant orchestrator, without requiring the orchestrator service 150 to perform that determination and forwarding process. Using multiple orchestrator services may provide additional benefits, for example, faster processing of particular data payloads.

It should be understood that embodiments in this disclosure are exemplary only, and that other embodiments may include various combinations of features from other embodiments, as well as additional or fewer features. For example, while some of the embodiments above pertain to routing data payloads through a plurality of microservices, any suitable activity may be used. In an exemplary embodiment, instead of or in addition to routing data payloads through a plurality of microservices, the data payloads may be routed by an orchestrator service through a plurality of applications or other non-microservice devices or services.

In general, any process or operation discussed in this disclosure that is understood to be computer-implementable, such as the processes illustrated in FIGS. 2 and 3, may be performed by one or more processors of a computer system, such any of the systems or devices in the environment 100 of FIG. 1, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

A computer system, such as a system or device implementing a process or operation in the examples above, may include one or more computing devices, such as one or more of the systems or devices in FIG. 1. One or more processors of a computer system may be included in a single computing device or distributed among a plurality of computing devices. A memory of the computer system may include the respective memory of each computing device of the plurality of computing devices.

Figure 4:
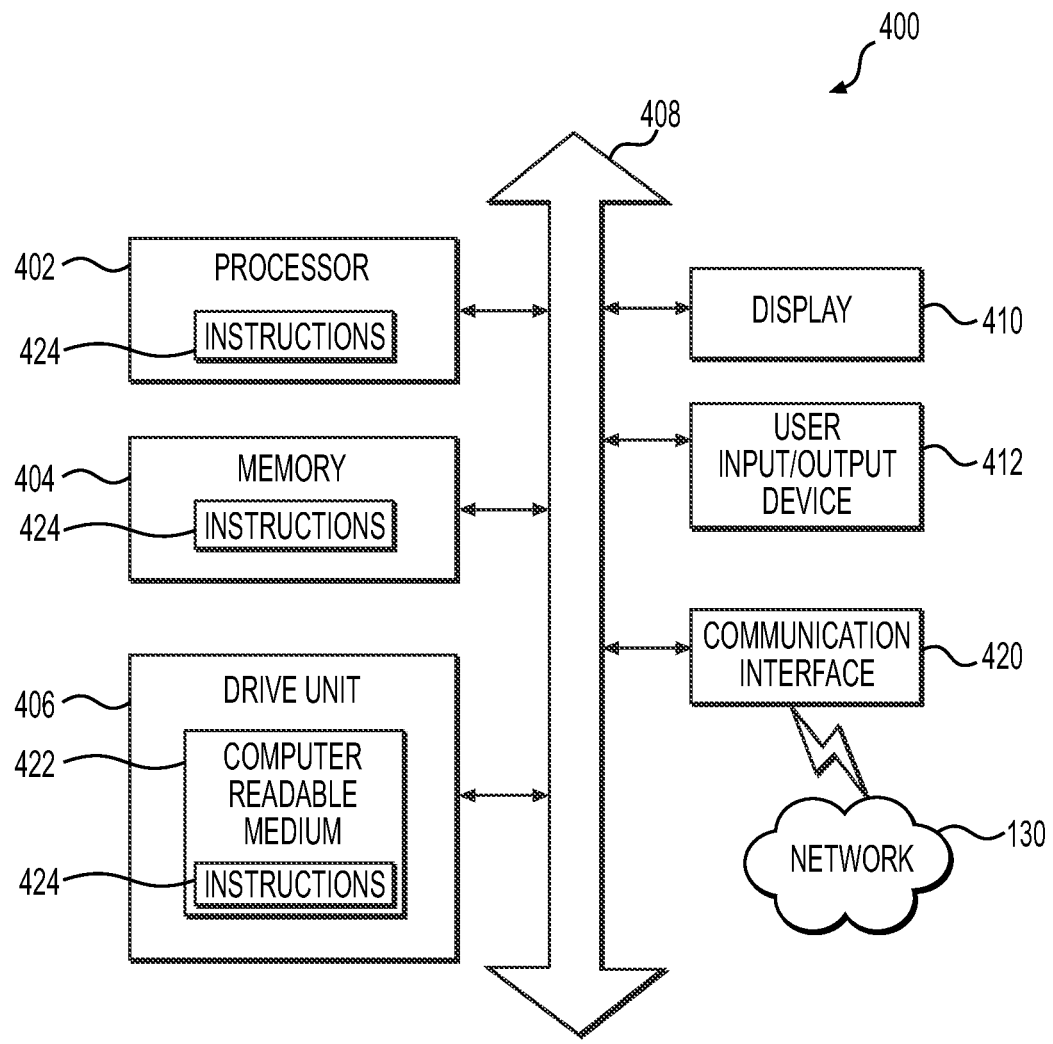
FIG. 4 depicts an example of a computing device, according to one or more embodiments.

FIG. 4 is a simplified functional block diagram of a computer 400 that may be configured as a device for executing the methods of FIGS. 2 and 3, according to exemplary embodiments of the present disclosure. For example, the computer 400 may be configured as the orchestrator service 150 and/or another system according to exemplary embodiments of this disclosure. In various embodiments, any of the systems herein may be a computer 400 including, for example, a data communication interface 420 for packet data communication. The computer 400 also may include a central processing unit ("CPU") 402, in the form of one or more processors, for executing program instructions. The computer 400 may include an internal communication bus 408, and a storage unit 406 (such as ROM, HDD, SDD, etc.) that may store data on a computer readable medium 422, although the computer 400 may receive programming and data via network communications. The computer 400 may also have a memory 404 (such as RAM) storing instructions 424 for executing techniques presented herein, although the instructions 424 may be stored temporarily or permanently within other modules of computer 400 (e.g., processor 402 and/or computer readable medium 422). The computer 400 also may include input and output ports 412 and/or a display 410 to connect with input and output devices such as keyboards, mice, touchscreens, monitors, displays, etc. The various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the disclosed methods, devices, and systems are described with exemplary reference to transmitting data, it should be appreciated that the disclosed embodiments may be applicable to any environment, such as a desktop or laptop computer, an automobile entertainment system, a home entertainment system, etc. Also, the disclosed embodiments may be applicable to any type of Internet protocol.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

What is claimed is:

1. A computer-implemented method for routing data payloads through a plurality of microservices, the method comprising:

receiving, by one or more processors via an orchestrator service, a data payload and first data that includes information regarding the data payload;

determining, using a trained machine learning model, a path through a first portion of the plurality of microservices associated with the data payload, the first portion of the plurality of microservices comprising one or more microservices required to process the data payload and excluding one or more microservices that are not required to process the data payload, wherein the trained machine learning model is trained based on second data that includes one or more prior data payloads and prior feedback data as test data;

generating a modified data payload by modifying, by the one or more processors via the orchestrator service, the data payload to include:

a first header, wherein the first header comprises a first microservice destination address associated with a first microservice of the first portion of the plurality of microservices; and a second header nested within the first header, wherein the second header comprises a second microservice destination address associated with a second microservice of the first portion of the plurality of microservices;

forwarding, by the one or more processors via the orchestrator service, the modified data payload to the first microservice based on the first header, such that the modified data payload is processed by the first microservice;

forwarding, by the one or more processors via the first microservice, the modified data payload processed by the first microservice to the second microservice based on the second header, such that the modified data payload is processed by the second microservice; and blocking, by the one or more processors and based on the second header, transmission of the modified data payload to a second portion of the plurality of microservices comprising one or more microservices that are not required to process the data payload.

2. The method of claim 1, further comprising:
forwarding, by the one or more processors, the modified data payload processed by the second microservice to one of:
a database;
an output stream; or
an outbound API.

3. The method of claim 1, wherein the processing by the first microservice comprises one or more of:
filtering data in the modified data payload;
inserting additional data into the modified data payload; or
generating a message associated with the modified data payload.

4. The method of claim 1, wherein the modified data payload is encrypted.

5. The method of claim 4, wherein the modified data payload is encrypted using one or more of: DES; Triple DES; AES; RSA; Twofish; Blowfish; Threefish; ElGamal; IDEA; RC6; Elliptic Curve Cryptography; or Diffie-Hellman.

6. The method of claim 1, wherein determining the path through a plurality of microservices associated with the data payload based on the first data further comprises determining, by a trained machine learning model based on the first data, the path through the plurality of microservices associated with the data payload, wherein the trained machine learning model is trained based on:
(i) second data that includes one or more prior data payloads and prior feedback data as test data, and
(ii) third data that includes one or more prior microservices corresponding to the one or more prior data payloads, to learn associations between the test data and the corresponding prior feedback data for each of the one or more prior data payloads, such that the trained machine learning model is configured to determine a path through a plurality of microservices associated with the data payload in response to input of the first data and the data payload.

7. The method of claim 1, further comprising:
receiving, by the one or more processors, a second data payload; and generating a second modified data payload by modifying, by the one or more processors via the orchestrator service, the second data payload to include:
a second data payload header, wherein the second data payload header comprises the first microservice destination address associated with the first microservice of the plurality of microservices; and
an additional data payload header nested within the second data payload header, wherein the additional data payload header comprises a third microservice destination address associated with a third microservice.

8. The method of claim 1, wherein the orchestrator service is one of a plurality of orchestrator services, the method further including:
selecting the orchestrator service of the plurality of orchestrator services based on the data payload.

9. The method of claim 1, wherein the modified data payload further includes a third header nested within the second header, wherein the third header comprises a third microservice destination address associated with a third microservice.

10. The method of claim 9, further comprising forwarding, by the one or more processors, the modified data payload to the third microservice based on the third header for processing by the third microservice.

11. A system for routing data through a plurality of microservices, the system comprising:
at least one memory storing instructions; and
at least one processor executing the instructions to perform a process including:
receiving, via an orchestrator service, a data payload;
receiving, via the orchestrator service, first data that includes information regarding the data payload;
determining a path through a plurality of microservices associated with the data payload based on the first data, using a trained machine learning model, a path through the plurality of microservices associated with the data payload based on the first data, wherein the trained machine learning model is trained based on second data that includes one or more prior data payloads and prior feedback data as test data;
generating a modified data payload by modifying, via the orchestrator service, the data payload to include:
a first header, wherein the first header comprises a first microservice destination address associated with a first microservice of the plurality of microservices; and
a second header nested within the first header, wherein the second header comprises a second microservice destination address associated with a second microservice of the plurality of microservices, to generate a modified data payload;
forwarding, via the orchestrator service, the modified data payload to the first microservice based on the first header, such that the modified data payload is processed by the first microservice;
forwarding, by the at least one processor via the first microservice, the modified data payload processed by the first microservice to the second microservice based on the second header, such that the modified data payload is processed by the second microservice; and
blocking, by the at least one processor and based on the second header, transmission of the modified data payload to a portion of the plurality of microservices comprising one or more microservices that are not required to process the data payload.

12. The system of claim 11, wherein the process further includes:

forwarding, by the at least one processor, the modified data payload processed by the second microservice to one of:
a database;
an output stream; or
an outbound API.

13. The system of claim 11, wherein the processing by the first microservice comprises one or more of:
filtering data in the modified data payload;
inserting additional data into the modified data payload; or
generating a message associated with the modified data payload.

14. The system of claim 11, wherein determining the path through a plurality of microservices associated with the data payload based on the first data further comprises determining, by a trained machine learning model based on the first data, the path through the plurality of microservices associated with the data payload, wherein the trained machine learning model is trained based on:
(i) second data that includes one or more prior data payloads and prior feedback data as test data, and
(ii) third data that includes one or more prior microservices corresponding to the one or more prior data payloads, to learn associations between the test data and the corresponding prior feedback data for each of the one or more prior data payloads, such that the trained machine learning model is configured to determine a path through a plurality of microservices associated with the data payload in response to input of the first data and the data payload.

15. The system of claim 11, wherein the modified data payload is encrypted using one or more of: DES; Triple DES; AES; RSA; Twofish; Blowfish; Threefish; ElGamal; IDEA; RC6; Elliptic Curve Cryptography; or Diffie-Hellman.

16. The system of claim 14, wherein the prior feedback data comprises one or more feedback scores for each of the one or more prior data payloads.

17. The system of claim 11, further comprising:
receiving a second data payload; and
generating a modified data payload by modifying, via the orchestrator service, the second data payload to include:
a second data payload header, wherein the second data payload header comprises the first microservice destination address associated with the first microservice of the plurality of microservices; and
an additional data payload header nested within the second data payload header, wherein the additional data payload header comprises a third microservice destination address associated with a third microservice, to generate a modified second data payload.

18. The system of claim 11, wherein the orchestrator service is one of a plurality of orchestrator services, the process further including:
selecting the orchestrator service of the plurality of orchestrator services based on the data payload.

19. The system of claim 11, wherein modifying the data payload further comprises modifying the data payload to include a third header nested within the second header, wherein the third header comprises a third microservice destination address associated with a third microservice, to generate the modified data payload, the process further including: forwarding the modified data payload processed by the second microservice to the third microservice based on the third header for processing by the third microservice.

20. A computer-implemented method for routing data through a plurality of microservices, the method comprising:
receiving, via an orchestrator service, a data payload;
receiving, via the orchestrator service, first data that includes information regarding the data payload;
determining, using a trained machine learning model, a path through the plurality of microservices associated with the data payload based on the first data, wherein the trained machine learning model is trained based on second data that includes one or more prior data payloads and prior feedback data as test data;
generating a modified data payload by modifying, via the orchestrator service, the data payload to include:
a first header, wherein the first header comprises a first microservice destination address associated with a first microservice of the plurality of microservices; and
a second header nested within the first header, wherein the second header comprises a second microservice destination address associated with a second microservice of the plurality of microservices, to generate a modified data payload;
forwarding, via the orchestrator service, the modified data payload to the first microservice based on the first header, such that the modified data payload is processed by the first microservice;
forwarding, via the first microservice, the modified data payload processed by the first microservice to the second microservice based on the second header, such that the modified data payload is processed by the second microservice; and
blocking, based on the second header, transmission of the modified data payload to a portion of the plurality of microservices comprising one or more microservices that are not required to process the data payload.

* * * * *